(12) United States Patent
Borkar (10) Patent No.: US 11,010,346 B2
(45) Date of Patent: May 18, 2021

(54) METHODS AND APPARATUS FOR MANAGING ACCESS TO FILE CONTENT (71) Applicant: MASTERCARD INTERNATIONAL INCORPORATED, Purchase, NY (US)

(72) Inventor: Vijaykumar Vamanrao Borkar, Pune (IN)

(73) Assignee: MASTERCARD INTERNATIONAL INCORPORATED, Purchase, NY (US)

(*) Notice: Subject to any disclaimer, the term of this patent is extended or adjusted under 35 U.S.C. 154(b) by 531 days.

(21) Appl. No.: 15/719,162

(22) Filed: Sep. 28, 2017

(65) Prior Publication Data

US 2018/0089221 A1 Mar. 29, 2018

(30) Foreign Application Priority Data

Sep. 29, 2016 (SG) .......................... 10201608149R (51) Int. Cl.
G06F 7/00 (2006.01)
G06F 16/176 (2019.01)
G06F 16/14 (2019.01)
G06F 21/62 (2013.01)

(52) U.S. Cl.
CPC ........ *G06F 16/1767* (2019.01); *G06F 16/148* (2019.01); *G06F 16/176* (2019.01); *G06F 21/6227* (2013.01); *G06F 2221/2147* (2013.01)

(58) Field of Classification Search
CPC .. G06F 16/1767; G06F 16/148; G06F 16/176; G06F 21/6227; G06F 2221/2147; G06F 16/9574; G06F 12/0875; G06F 12/0862; G06F 12/1881; G06F 2212/452
See application file for complete search history.

(56) References Cited

U.S. PATENT DOCUMENTS

| 9,075,893 | B1* | 7/2015 | Jenkins | G06F 16/9574 |
| 2009/0271448 | A1* | 10/2009 | Chen | G06F 16/245 |
| 2015/0142776 | A1* | 5/2015 | Solheim | G06F 16/9535 |
| | | | | 707/722 |
| 2015/0248384 | A1* | 9/2015 | Luo | G06F 40/197 |
| | | | | 715/229 |
| 2017/0060892 | A1* | 3/2017 | Vuppula | G06F 16/178 |

FOREIGN PATENT DOCUMENTS

EP 2 498 201 A1 9/2012

OTHER PUBLICATIONS

Zhu et al. (2008) Proceedings of the IEEE International Symposium on Electronic Commerce and Security. pp. 1010-1014.
International Search Report with Written Opinion corresponding to International Patent Application No. PCT/US2017/050930, dated Oct. 19, 2017.

* cited by examiner

*Primary Examiner* — Azam M Cheema
(74) *Attorney, Agent, or Firm* — Michael Best & Friedrich LLP (57) ABSTRACT

A method of providing access to file content comprises: receiving, at a shared file content server, a request to access file content stored on the shared file content server from a requestor; determining a shared portion of the file content using stored shared portion indication data; and providing the shared portion of the file content to the requestor. The method allows partial sharing of file content.

19 Claims, 6 Drawing Sheets

METHODS AND APPARATUS FOR MANAGING ACCESS TO FILE CONTENT

RELATED APPLICATIONS

The present application claims priority to Singapore Patent Application No. 10201608149R filed Sep. 29, 2016, the entire content of which is incorporated by reference herein.

TECHNICAL FIELD AND BACKGROUND

The present disclosure relates to methods and apparatus that allow sharing of file content.

File sharing systems allow access to file content to be controlled. Most file sharing systems control the access to the entire file for any operation such as read/write/delete etc. This is an all or nothing approach. Some other sharing forms work based on extracting the contents of the file and creating a new copy of the contents before sharing it with someone. If the original file contents are updated, the updates are not shared automatically with other users. In cases where confidential files are to be made searchable, the meta-data for search indexes may be provided separately by the file owners. When such files are updated, the meta-data becomes invalid, and search results are incorrect.

SUMMARY

In general terms, the present disclosure proposes methods of managing access to file content by storing an indication of a shared portion or shared portions of the file content as well as the file content itself. This allows partial sharing of the file content.

According to a first aspect of the present invention, there is provided a method of providing access to file content. The method comprises: receiving, at a shared file content server, a request to access file content stored on the shared file content server from a requestor; determining a shared portion of the file content using stored shared portion indication data; and providing the shared portion of the file content to the requestor.

The shared content indication data may comprise one or more rules and the shared portion of the file content may be determined using stored shared portion indication data, which comprises applying the rules to the content.

The shared content indication data may comprise indications of locations within the stored file content and the shared portion of the file content may be determined using stored shared portion indication data, which comprises using the indications of locations to determine the shared portion.

In an embodiment, the stored file content comprises at least a first file content portion and a second file content portion; and the shared portion indication data comprises a first indication indicating whether the first file content portion is shared and a second indication indicating whether the second file content portion is shared and wherein determining a shared portion of the file content using stored shared portion indication data, which comprises using the first indication and the second indication to determine the shared portion.

The shared content indication data may comprise a search expression, and the shared portion of the file content may be determined using stored shared portion indication data comprises using the search expression to identify the shared portion.

The search expression may be used to identify a location in the file content using the search expression and the location in the file content can then be used to determine the shared portion.

Embodiments of the present invention may further comprise receiving an update to the shared portion; and storing an updated shared portion.

The file content may comprise a plurality of portions and storing an updated shared portion comprises storing updated shared portion indication data indicating the updated shared portion. The updated shared portion indication data may further indicate a version of the shared portion without the update.

According to a second aspect of the present invention, there is provided a method of storing file content for sharing. The method comprises: receiving, at a shared file content server, file content and an indication of a shared portion of the file content; and storing the file content and shared portion indication data indicating the shared portion of the file content.

In an embodiment, the shared content indication data comprises one or more rules for identifying the shared portion of the file content.

In an embodiment, the shared content indication data comprises indications of locations within the stored file content.

In an embodiment storing the file content comprises dividing the file content into at least a first file content portion and a second file content portion, the first file content portion comprising the shared portion of the file content; and storing the shared portion indication data comprises storing a first indication indicating that the first file content portion is shared and a second indication indicating that the second file content portion is not shared.

The indication of a shared portion of the file content may comprise a search expression, and storing the shared portion indication data comprises storing the search expression.

According to a third aspect of the present invention there is provided an apparatus for providing access to file content. The apparatus comprises: a computer processor and a data storage device, the data storage device having a shared content determination module comprising non-transitory instructions operative by the processor to: receive a request to access file content stored on the shared file content server from a requestor; determine a shared portion of the file content using stored shared portion indication data; and provide the shared portion of the file content to the requestor.

According to a yet further aspect, there is provided a non-transitory computer-readable medium. The computer-readable medium has stored thereon program instructions for causing at least one processor to perform operations of a method disclosed above.

BRIEF DESCRIPTION OF THE DRAWINGS

Embodiments of the invention will now be described for the sake of non-limiting example only, with reference to the following drawings in which.

DETAILED DESCRIPTION

Figure 1:
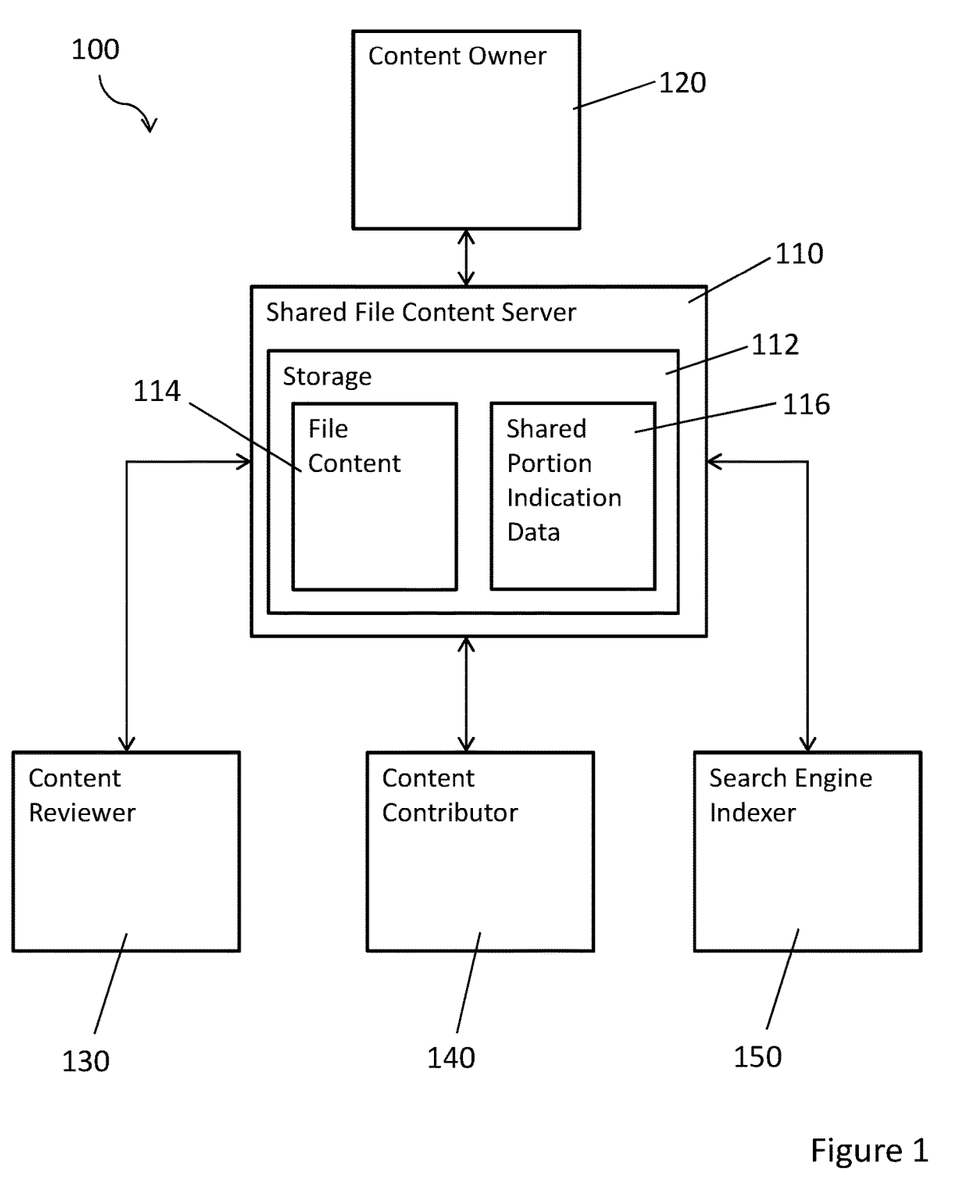
FIG. 1 is a block diagram showing a system for managing access to file content according to an embodiment of the present invention.

FIG. 1 is a block diagram showing a system for managing access to file content according to an embodiment of the present invention. The system 100 comprises a shared file content server 110. Various users can connect to the shared file content server 110. These users are: a content owner 120; a content reviewer 130; a content contributor 140 and a search engine indexer 150. Each of these users corresponds to a terminal such as a computer connected to the shared file content server 110 via a network. The communication between the users and the shared file content server 110 may take place via any types of network, for example, virtual private network (VPN), the Internet, a local area and/or wide area network (LAN and/or WAN), and so on.

The shared file content server 110 comprises storage 112 which stores file content 114 and shared portion indication data 116. The file content 114 may comprise any kind of stored file content such text documents, spread sheets, database files. In some embodiments, the file contents comprises recurring files whose contents are governed by standard syntaxes such as Clearing Files, Settlement files, Payment Authentication messages.

In the system 100, the content owner 120 is the owner of the file content 114 stored in the storage 112 of the shared file content server 110. The content reviewer 130 has read access to the file content 114 stored in the storage 112 of the shared file content server 110. In some embodiments, the content reviewer 130 may also be able to provide feedback on the file contents 114, for example by adding comments which may be stored as meta-data in the storage 112 of the shared file content server 110. The content contributor 140 can make changes to the file content 114 stored in the storage 112 of the shared file content server 110. The search engine indexer 150 can extract data from the file content 114 and make the file content 114 searchable. The shared file content server 110 controls the access of the content reviewer 130; the content contributor 140; and the search engine indexer 150 according to the shared portion indication data 116. The shared portion indication data 116 indicates a part of the file content 114 or a plurality of parts of the file content 114 which is shared. This may be based on a selection made by the content owner 120. The shared file content server 110 allows the content reviewer 130; the content contributor 140; and the search engine indexer 150 to access the parts of the file content 114 indicated to be shared by the shared portion indication data 116. This allows the various users to access parts of the file content 114 without accessing parts which the content owner does not wish to make available, for example confidential information.

In some embodiments, an indication of the access rights of the content reviewer 130; the content contributor 140 and the search engine indexer 150 are stored as part of the shared portion indication data 116. In some embodiments, the indication of the access rights of the content reviewer 130; the content contributor 140 and the search engine indexer 150 are tied to the shared portion indication data 116 via an authorization system which is external to system 100. Such an authorization system may be implemented using a Lightweight Directory Access Protocol (LDAP). The content owner 120 may provide different shared portion indication data 116 for different types of users.

Figure 2:
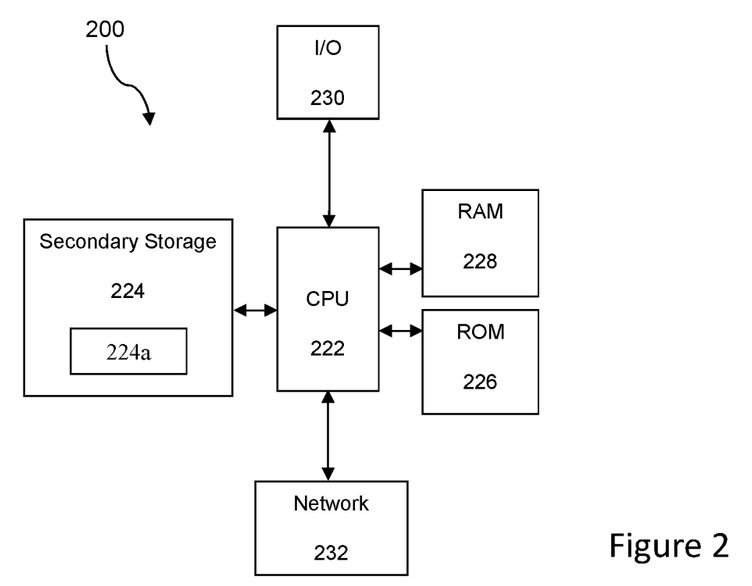
FIG. 2 is a block diagram showing a technical architecture of a shared file content server according to an embodiment of the present invention.

FIG. 2 is a block diagram showing a technical architecture 200 of the shared file content server 110 for performing steps of exemplary methods 300, 400, and 800 which are described below with reference to FIG. 4. Typically, the methods 300, 400, and 800 are implemented by a number of computers each having a data-processing unit. The block diagram as shown in FIG. 2 illustrates a technical architecture 200 of a computer which is suitable for implementing one or more embodiments herein.

The technical architecture 200 includes a processor 222 (which may be referred to as a central processor unit or CPU) that is in communication with memory devices including secondary storage 224 (such as disk drives), read only memory (ROM) 226, random access memory (RAM) 228. The processor 222 may be implemented as one or more CPU chips. The technical architecture 200 may further comprise input/output (I/O) devices 230, and network connectivity devices 232.

The secondary storage 224 is typically comprised of one or more disk drives or tape drives and is used for non-volatile storage of data and as an over-flow data storage device if RAM 228 is not large enough to hold all working data. Secondary storage 224 may be used to store programs which are loaded into RAM 228 when such programs are selected for execution. In this embodiment, the secondary storage 224 has a shared portion determination module 224a comprising non-transitory instructions operative by the processor 222 to perform various operations of the method of the present disclosure. The ROM 226 is used to store instructions and perhaps data which are read during program execution. The secondary storage 224, the RAM 228, and/or the ROM 226 may be referred to in some contexts as computer readable storage media and/or non-transitory computer readable media.

The I/O devices may include printers, video monitors, liquid crystal displays (LCDs), plasma displays, touch screen displays, keyboards, keypads, switches, dials, mice, track balls, voice recognizers, card readers, paper tape readers, or other well-known input devices.

The network connectivity devices 232 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards that promote radio communications using protocols such as code division multiple access (CDMA), global system for mobile communications (GSM), long-term evolution (LTE), worldwide interoperability for microwave access (WiMAX), near field communications (NFC), radio frequency identity (RFID), and/or other air interface protocol radio transceiver cards, and other well-known network devices. These network connectivity devices 232 may enable the processor 222 to communicate with the Internet or one or more intranets.

With such a network connection, it is contemplated that the processor 222 might receive information from the network, or might output information to the network in the course of performing the above-described method operations. Such information, which is often represented as a sequence of instructions to be executed using processor 222, may be received from and outputted to the network, for example, in the form of a computer data signal embodied in a carrier wave.

The processor 222 executes instructions, codes, computer programs, scripts which it accesses from hard disk, floppy disk, optical disk (these various disk based systems may all be considered secondary storage 224), flash drive, ROM 326, RAM 328, or the network connectivity devices 232. While only one processor 222 is shown, multiple processors may be present. Thus, while instructions may be discussed as executed by a processor, the instructions may be executed simultaneously, serially, or otherwise executed by one or multiple processors.

It is understood that by programming and/or loading executable instructions onto the technical architecture 200, at least one of the CPU 222, the RAM 228, and the ROM 226 are changed, transforming the technical architecture 200 in part into a specific purpose machine or apparatus having the novel functionality taught by the present disclosure. It is fundamental to the electrical engineering and software engineering arts that functionality that can be implemented by loading executable software into a computer can be converted to a hardware implementation by well-known design rules.

Although the technical architecture 200 is described with reference to a computer, it should be appreciated that the technical architecture may be formed by two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the technical architecture 200 to provide the functionality of a number of servers that is not directly bound to the number of computers in the technical architecture 200. In an embodiment, the functionality disclosed above may be provided by executing the application and/or applications in a cloud computing environment. Cloud computing may comprise providing computing services via a network connection using dynamically scalable computing resources. A cloud computing environment may be established by an enterprise and/or may be hired on an as-needed basis from a third party provider.

Various operations of an exemplary method 300 will now be described with reference to FIG. 3 in respect of storing file content for sharing. It should be noted that enumeration of operations is for purposes of clarity and that the operations need not be performed in the order implied by the enumeration.

Figure 3:
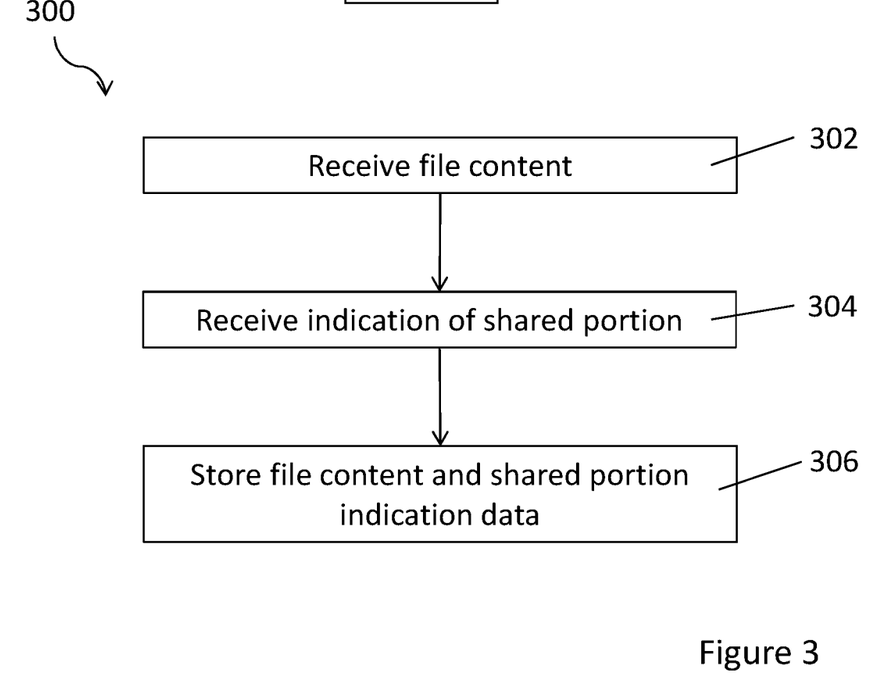
FIG. 3 is a flow chart showing a method of storing file content for sharing according to an embodiment of the present invention.

FIG. 3 is a flow chart showing a method of storing file content for sharing according to an embodiment of the present invention.

In step 302, the shared file content server 110 receives file content from the content owner 120. In step 304 the shared file content server 110 receives an indication of a shared portion or a plurality of shared portions of the file content from the content owner 120.

The selection of the content as the portion or a plurality of shared portions may be made by the content owner 120 through a document view made available by the shared file content server 110.

In step 306, the shared file content server 110 stores the file content 114 and shared portion indication data 116 in the storage 112. The shared portion indication data 116 indicates the shared portion or plurality of shared portions of the file content 114. Embodiments of the storage of the file content 114 and the shared portion indication data 116 are described in more detail below with reference to FIGS. 5, 6 and 7.

Once the file content 114 and the shared portion indication data 116 are stored in the storage 112, the shared file content server 110 may send a notification to the content reviewer 130, the content contributor 140 and/or the search engine indexer 150 indicating the availability of shared contents.

Various operations of an exemplary method 400 will now be described with reference to FIG. 4 in respect of providing access to stored file content. It should be noted that enumeration of operations is for purposes of clarity and that the operations need not be performed in the order implied by the enumeration.

Figure 4:
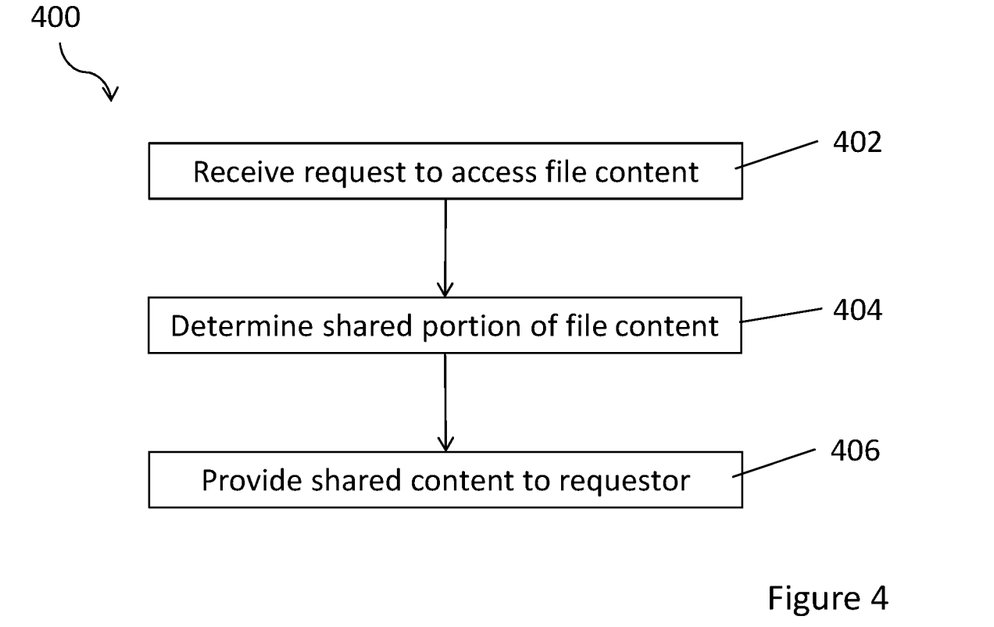
FIG. 4 is a flow chart showing a method of providing access to stored file content according to an embodiment of the present invention.

FIG. 4 is a flow chart showing a method of providing access to stored file content according to an embodiment of the present invention.

In step 402, the shared file content server 110 receives a request from a requestor to access the file content. The requestor may be the content reviewer 130, the content contributor 140 or the search engine indexer 150. The request to access the file content may be in response to a notification from the shared file content server 110 indicating the availability of shared content.

In step 404, the shared portion determination module 224a of the shared file content server 110 determines a shared portion or shared portions of the file content 114 using the shared portion indication data 116.

In step 406, the shared file content server 110 provides the requestor access to the shared portion or shared portions of the file content. The access may be provided by a document viewer made available by the shared file content server 110. Thus the requestor can only view the file content which is indicated as shared by the shared portion indication data 116. In some embodiments, the requestor may also be able to edit or make comments on the shared file content. For example, the content reviewer 130 may be allowed to add comments on the file contents. The shared file content server 110 would then store these comments as metadata linked to the file contents. The content contributor 140 is able to edit the shared portion of the file contents. This editing may take place through the document viewer made available by the shared file content server 110.

Figure 5:
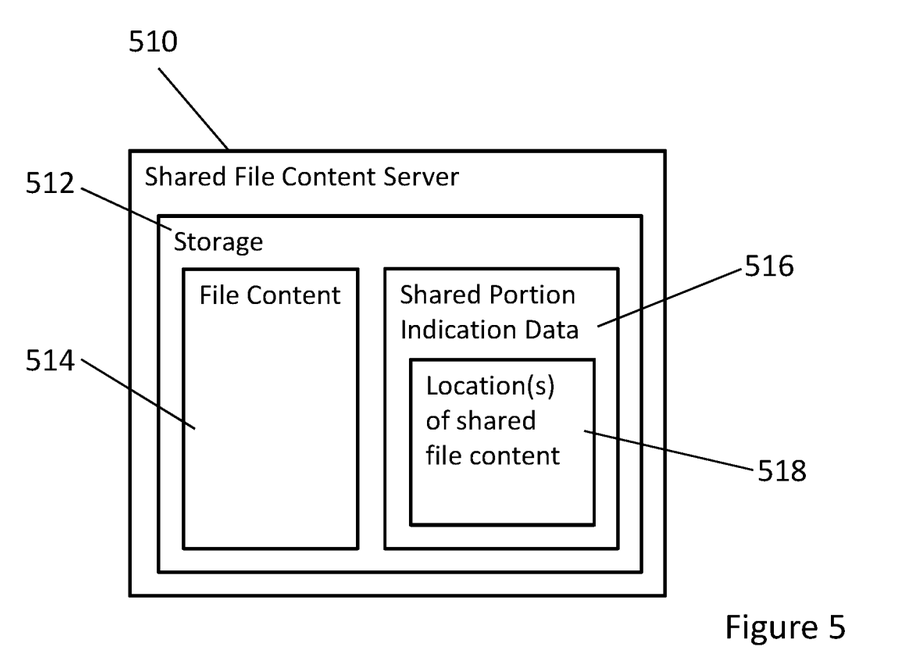
FIG. 5 is a block diagram illustrating the data stored on a shared file content server according to an embodiment of the present invention.

FIG. 5 is a block diagram illustrating the data stored on a shared file content server according to an embodiment of the present invention.

As shown in FIG. 5, the shared content file server 510 has a storage 512. The storage 512 stores file content 514. The storage 512 also stores shared portion location indication data 516. The shared portion location indication data comprises indications 518 of the location or locations of the shared file content. The indications 518 of the location or locations of the shared file content may comprise indications of the boundaries of the shared portion or shared portions of the file content. The indications 518 of the location or locations of the shared file content thus provide co-ordinates of the shared file contents.

Thus, when the shared content file server 510 is implemented as shown in FIG. 5, in step 306 of the method 300 shown in FIG. 3, the shared file content server 510 stores indications of the locations of the shared portions of the file content, for example as the coordinates of the boundaries of the shared file content.

Similarly, in step 404 of the method 400 shown in FIG. 4, the shared file content server 510 determines the shared portion or the shared portions of the file content using the indications of the locations of the shared portions of the file content.

Figure 6:
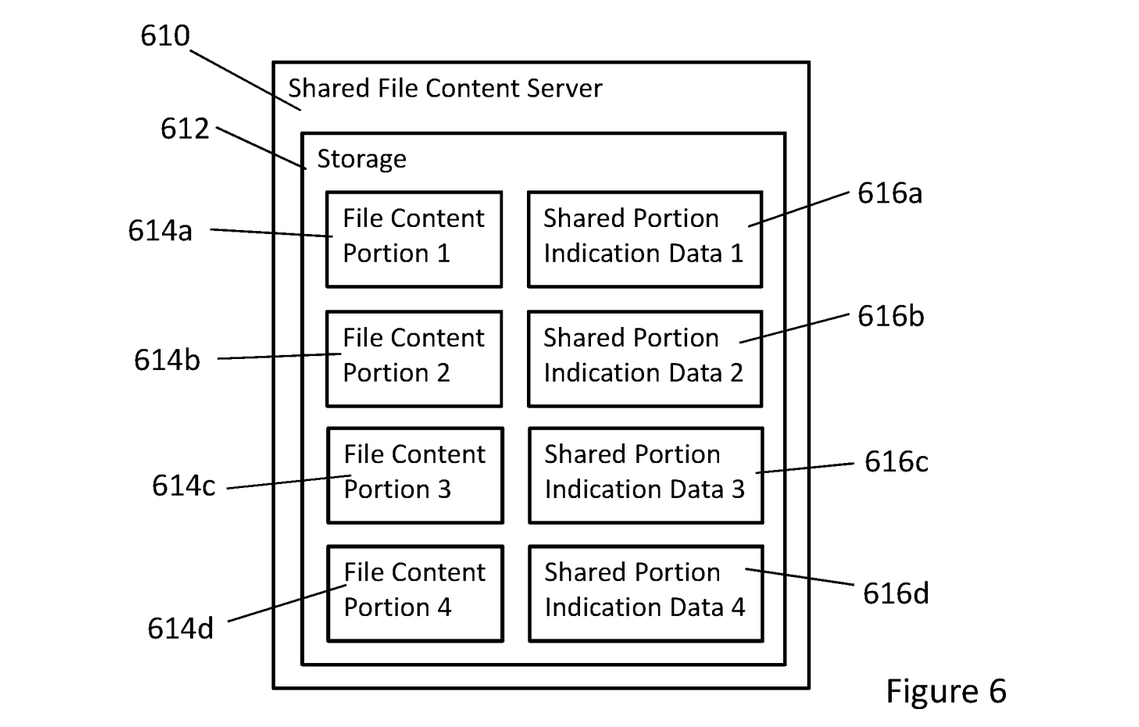
FIG. 6 is a block diagram illustrating the data stored on a shared file content server according to an embodiment of the present invention.

FIG. 6 is a block diagram illustrating the data stored on a shared file content server according to an embodiment of the present invention.

In the embodiment shown in FIG. 6, the storage 612 of the shared file content server 610 stores the file contents as a plurality of portions. The storage 612 also comprises shared portion indication data for each of the portions. As shown in FIG. 6, the storage 612 of the shared file content server 610 stores a first file content portion 614a; a second file content portion 614b; a third file content portion 614c; and a fourth file content portion 614d. The storage 612 also stores first shared portion indication data 616a which is metadata associated with the first file content portion 614a. Similarly, the storage 612 stores second shared portion indication data 616b which is metadata associated with the second file content portion 614b; third shared portion indication data 616c which is metadata associated with the third file content portion 614c; and fourth shared portion indication data 616d which is metadata associated with the fourth file content portion 614d. The shared portion indication data 616a-616d comprises an indication of a previous region, for example in the form of an address; an indication of a next region, for example in the form of an address; and indications of sharing settings, for example whether the corresponding file content portion is shared or private and if the file content portion is shared, which parties can access the file content portion and whether the file content portion can be edited.

When the shared file content server 610 is implemented as shown in FIG. 6, in step 306 of the method 300 shown in FIG. 3, the shared file content server 610 divides the file content into separate portions based on the information received from the content owner 120 and stores shared portion indication data separately for each of the file content portions.

Further, in step 404 of the method 400 shown in FIG. 4, the shared file content server 610 only provides the file content portions which are indicated as shared in response to a request from a requestor.

Figure 7:
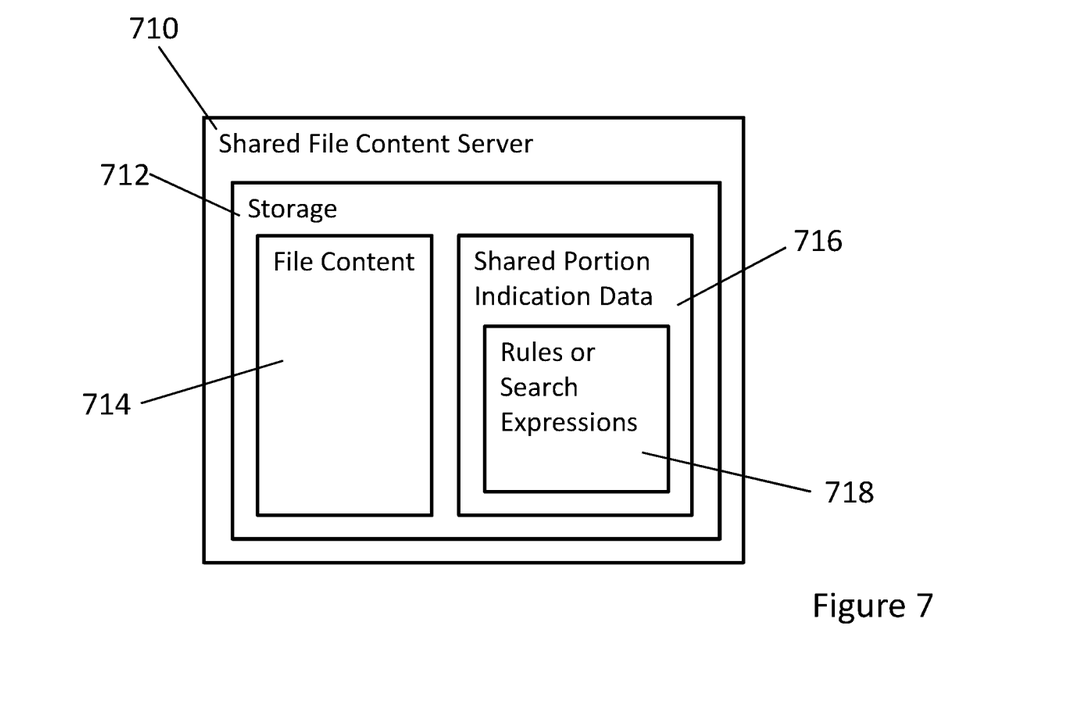
FIG. 7 is a block diagram illustrating the data stored on a shared file content server according to an embodiment of the present invention.

FIG. 7 is a block diagram illustrating the data stored on a shared file content server according to an embodiment of the present invention.

In the embodiment shown in FIG. 7, the storage 712 of the shared file content server 710 stores file content 714 and shared portion indication data 716. The shared portion indication data comprises rules or search expressions 718 which are used by the shared content file server 710 to determine shared portions of the file content 714. The search expressions may specify the boundaries of shared content. For example the search expressions may specify that content from text matching 'Appendix A' until text matching 'Appendix B' is shared.

When the shared file content server 710 is implemented as shown in FIG. 7, the indication of the shared portion received in step 304 of the method 300 shown in FIG. 3 may be received as the rules or search expressions. The content owner 120 may input the rules/search expression while providing the file content 114. Optionally, there may be pre-defined rules/search expressions stored in the shared file content server 110 and the content owner 120 may select rules/search expressions from those while providing the file content 114.

In step 404 of the method 400 shown in FIG. 4, the shared file content server 710 determines the shared portion or portions by applying the rules or search expressions to the file content.

Various operations of an exemplary method 800 will now be described with reference to FIG. 8 in respect of allowing an update to shared file content. It should be noted that enumeration of operations is for purposes of clarity and that the operations need not be performed in the order implied by the enumeration.

Figure 8:
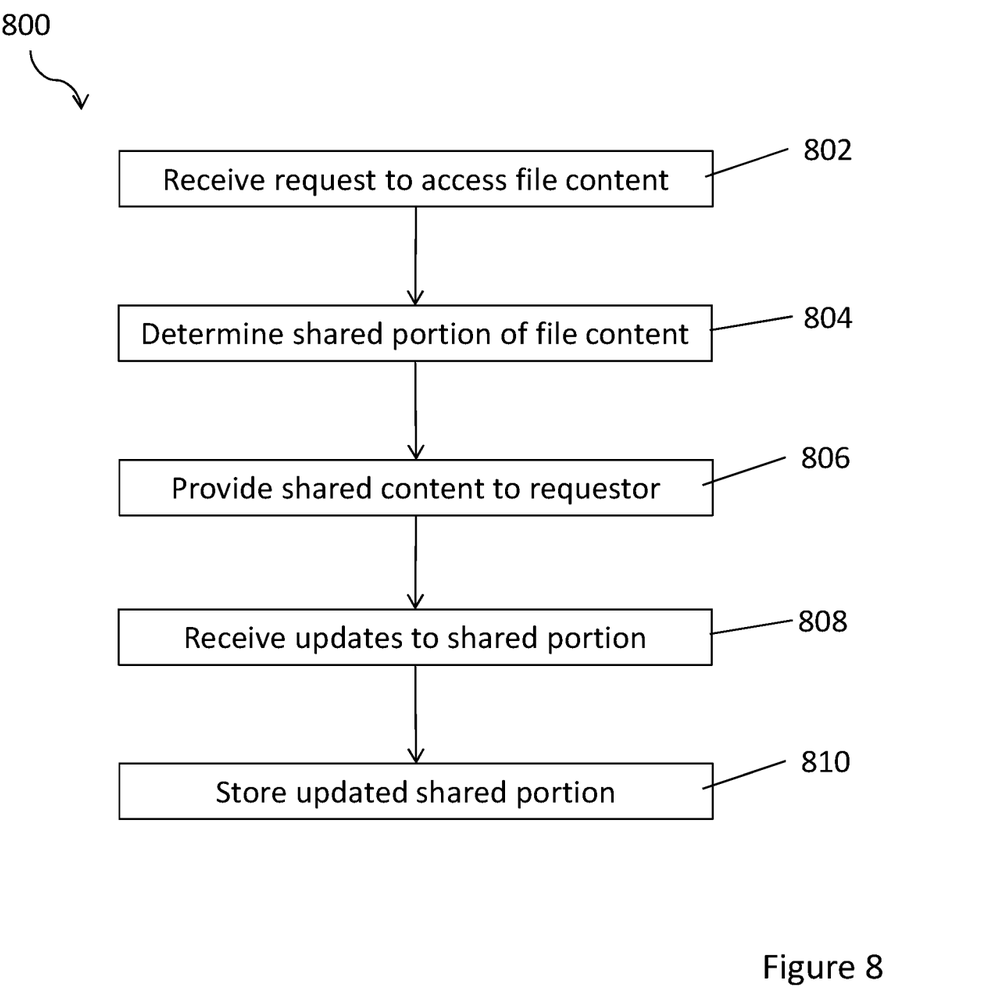
FIG. 8 is a flow chart showing a method of allowing updating of shared file content according to an embodiment of the present invention.

FIG. 8 is a flow chart showing a method of allowing updating of shared file content according to an embodiment of the present invention.

In step 802, the shared file content server 110 receives a request from a requestor to access the file content. In this embodiment, the requestor is the content contributor 140. In step 804, the shared portion determination module 224a of the shared file content server 110 determines a shared portion or shared portions of the file content 114 using the shared portion indication data 116.

In step 806, the shared file content server 110 provides the requestor access to the shared portion or shared portions of the file content. The access may be provided by a document viewer made available by the shared file content server 110.

The content contributor 140 may be provided access to the file content through an editor such as a word processor. Thus the content contributor 140 can make changes to the shared content.

In step 808, the updates to the shared content are received by the shared file content server 110.

In step 810, the updated shared portion is stored by the shared file content server 110. The updates may be stored in response to an action by the content contributor 140, for example a request to save the changes.

Figure 9A:
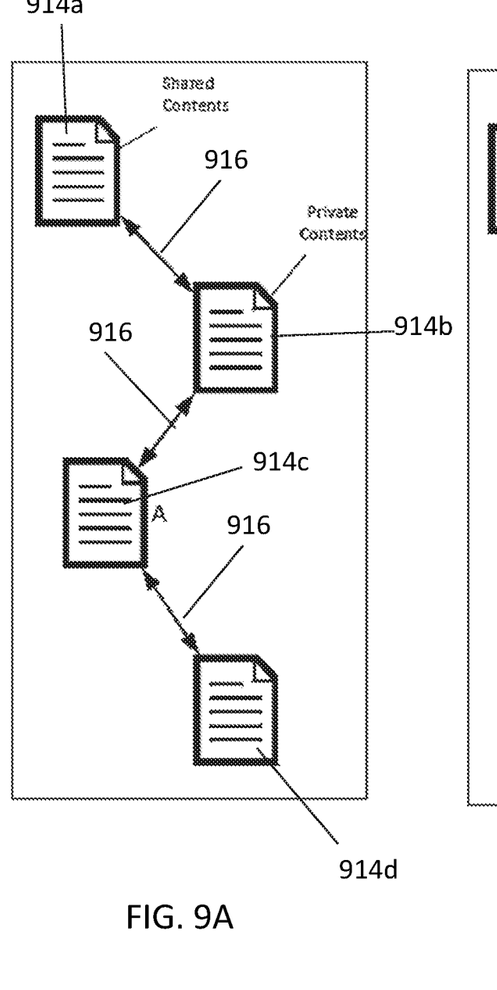
FIGS. 9a and 9b show an example of storing updates to shared content according to an embodiment of the present invention.
Figure 9B:
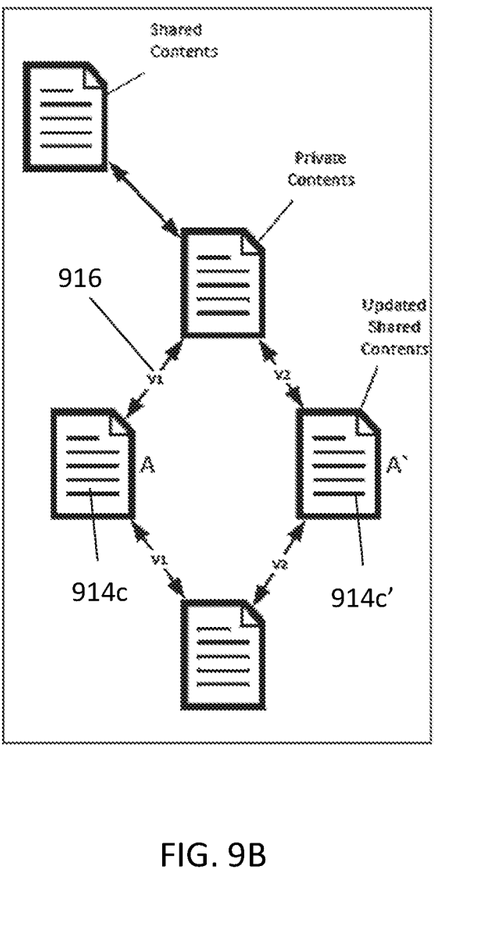

FIGS. 9a and 9b show an example of storing updates to shared content according to an embodiment of the present invention. The example shown in FIGS. 9a and 9b corresponds to the shared file content server 610 shown in FIG. 6.

FIG. 9a shows the file content prior to the update. As shown in FIG. 9a, the file content comprises four portions: a first portion 914a which has been designated by the content owner 120 as shared; a second portion 914b which has been designated by the content owner 120 as private; a third portion 914c which has been designated by the content owner 120 as shared and a fourth portion 914d which has been designated by the content owner 120 as private. As shown in FIG. 9a, shared portion indication data 916 links the four portions of the file content. The shared portion indication data 916 may be stored as separate shared portion indication data as described above with reference to FIG. 6.

In the example shown in FIGS. 9a and 9b, a content contributor 140 makes changes to the third portion 914c of the file content which is marked A in FIG. 9a. The updated version of the third portion 914c' is marked as A' in FIG. 9b.

As shown in FIG. 9b, the updated version of the third portion 614c' is stored by the shared file content server 110. In the example embodiment shown in FIG. 9b, the earlier version of the third portion 614c is also stored. As shown in FIG. 9b, the shared portion indication data 916 indicates the links between the second portion 914b with both the earlier version of the third portion 914c and the updated version of the third portion 914c'. As shown in FIG. 9b, these links indicate the earlier version as v1 and the later version as v2.

These links may be stored as part of the shared portion indication data corresponding to the neighboring file content portions.

As described above, embodiments of the invention allow users to collaborate without having access to all the file contents. Further embodiments of the invention allow a search engine to extract more accurate meta-data to index and frees file owner from trying to keep meta-data and file contents in sync. In some embodiments dynamic rule based content sharing rules are useful for recurring files where contents is governed by standard syntaxes—e.g. Clearing Files, Settlement files, Payment Authentication messages. This could be alternative to masking sensitive information; instead of saying what is confidential, in embodiments of the present invention, a content owner can say what is sharable.

Whilst the foregoing description has described exemplary embodiments, it will be understood by those skilled in the art that many variations of the embodiment can be made within the scope and spirit of the present invention.

The invention claimed is:

1. A method of providing access to file content, the method comprising:
receiving, at a shared file content server, a request to access file content stored on the shared file content server from a requestor, wherein the file content includes a recurring file;
determining a shared portion of the file content using stored shared portion indication data; and
providing access to the shared portion of the file content to the requestor based on an access right of the requestor,
wherein the shared portion indication data includes a first indication of a previous portion of the file content that precedes the shared portion of the file content and a second indication of a next portion of the file content that is subsequent to the shared portion of the file content and wherein determining the shared portion of the file content using the stored shared portion indication data includes determining the shared portion of the file content using the first indication and the second indication.

2. A method according to claim 1, wherein the shared portion indication data comprises indications of locations within the stored file content and wherein determining a shared portion of the file content using stored shared portion indication data comprises using the indications of locations to determine the shared portion.

3. A method according to claim 1, wherein the stored file content comprises at least a first file content portion and a second file content portion; and
the shared portion indication data comprises a third indication indicating whether the first file content portion is shared and a fourth indication indicating whether the second file content portion is shared and wherein determining a shared portion of the file content using stored shared portion indication data comprises using the third indication and the fourth indication to determine the shared portion.

4. A method according to claim 1, wherein the shared portion indication data comprises a search expression, and wherein determining a shared portion of the file content using stored shared portion indication data comprises using the search expression to identify the shared portion.

5. A method according to claim 4, wherein using the search expression to identify the shared portion comprises identifying a location in the file content using the search expression and using the location in the file content to determine the shared portion.

6. The method of according to claim 1, further comprising:
receiving an update to the shared portion from the requestor; and
storing an updated version of the shared portion.

7. A method of storing file content for sharing, the method comprising:
receiving, at a shared file content server, file content and shared portion indication data indicating a shared portion of the file content, wherein the file content includes a recurring file; and
storing the file content and the shared portion indication data indicating the shared portion of the file content, wherein the shared portion indication data includes an indication of access rights for at least one type of user, the access rights used to authorize access to the shared content portion,
wherein the shared portion indication data includes a first indication of a previous portion of the file content that precedes the shared portion of the file content and a second indication of a next portion of the file content that is subsequent to the shared portion of the file content and wherein determining the shared portion of the file content using the stored shared portion indication data includes determining the shared portion of the file content using the first indication and the second indication.

8. A method according to claim 7, wherein storing the file content comprises
dividing the file content into at least a first file content portion and a second file content portion, the first file content portion comprising the shared portion of the file content; and
storing the shared portion indication data comprises storing a third indication indicating that the first file content portion is shared and a fourth indication indicating that the second file content portion is not shared.

9. A method according to claim 7, wherein the indication of a shared portion of the file content comprises a search expression, and storing the shared portion indication data comprises storing the search expression.

10. The method according to claim 7, further comprising:
in response to the file content and the shared portion indication data being stored, sending a notification indicating an availability of the shared portion.

11. An apparatus for providing access to file content, the apparatus comprising:
a computer processor and
a data storage device, the data storage device having a shared content determination module comprising non-transitory instructions operative by the processor to:
receive a request to access file content stored on the shared file content server from a requestor, wherein the file content includes a recurring file;
determine a shared portion of the file content using stored shared portion indication data; and
control access to the shared portion of the file content to the requestor based on an access right associated with the requestor,
wherein the shared portion indication data includes a first indication of a previous portion of the file content that precedes the shared portion of the file content and a second indication of a next portion of the file content that is subsequent to the shared portion of the file content and wherein determining the shared portion of the file content using the stored shared portion indication data includes determining the shared portion of the file content using the first indication and the second indication.

12. An apparatus according to claim 11, wherein the shared portion indication data comprises one or more rules and wherein the shared content determination module further comprises non-transitory instructions operative by the processor to:
determine the shared portion of the file content by applying the rules to the file content.

13. An apparatus according to claim 11, wherein the stored file content comprises
at least a first file content portion and a second file content portion; and
the shared portion indication data comprises a third indication indicating whether the first file content portion is shared and a fourth indication indicating whether the second file content portion is shared and wherein the shared content determination module further comprises non-transitory instructions operative by the processor to:
determine the shared portion of the file content by using the third indication and the fourth indication to determine the shared portion.

14. An apparatus according to claim 11, wherein the shared portion indication data comprises a search expression, and wherein the shared content determination module further comprises non-transitory instructions operative by the processor to:
determine the shared portion of the file content by using the search expression to identify the shared portion.

15. An apparatus according to claim 14, wherein using the search expression to identify the shared portion comprises identifying a location in the file content using the search expression and using the location in the file content to determine the shared portion.

16. An apparatus according to claim 11, wherein the data storage device further comprises non-transitory instructions operative by the processor to:
receive, at a shared file content server, file content and a shared portion indication data indicating a shared portion of the file content; and
store the file content and the shared portion indication data indicating the shared portion of the file content.

17. An apparatus according to claim 16, wherein the data storage device further comprises non-transitory instructions operative by the processor to:
store the file content by dividing the file content into at least a first file content portion and a second file content portion, the first file content portion comprising the shared portion of the file content; and
to store the shared portion indication data by storing a third indication indicating that the first file content portion is shared and a fourth indication indicating that the second file content portion is not shared.

18. The apparatus according to claim 11, wherein the data storage device further comprises non-transitory instructions operative by the processor to:
in response to the requestor being authorized to access the shared portion, provide access to the shared portion of the file content to the requestor.

19. The apparatus according to claim 11, wherein the shared portion is governed by a standard syntax.

* * * * *